June 15, 1965 A. M. FILAK 3,189,198

SMALL BOAT DRY STORAGE FACILITY

Filed Oct. 3, 1963 4 Sheets-Sheet 1

INVENTOR.
ANDREW M. FILAK

BY William C. Babcock

ATTORNEY

FIG. 2
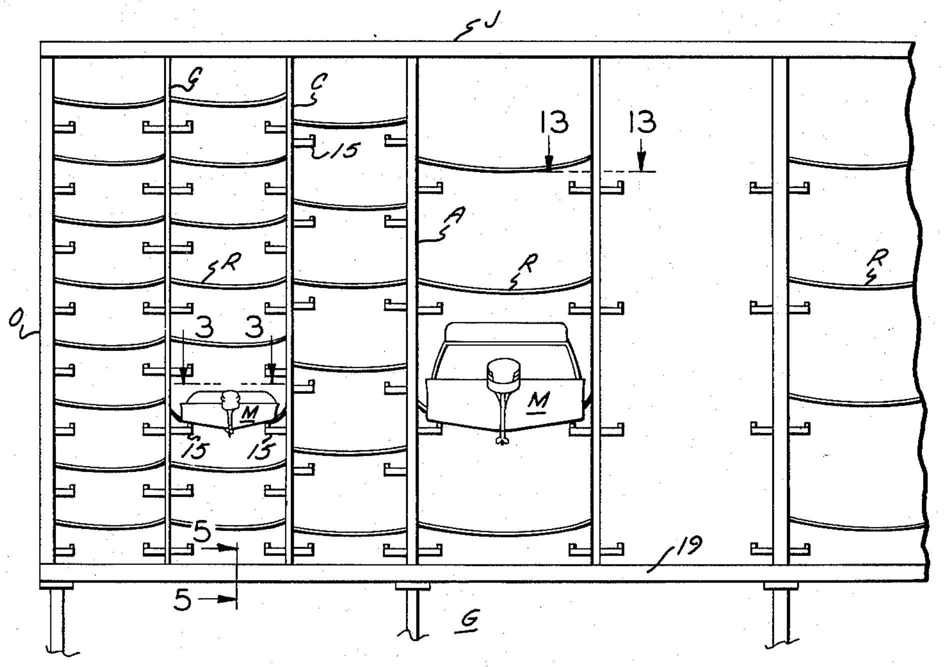
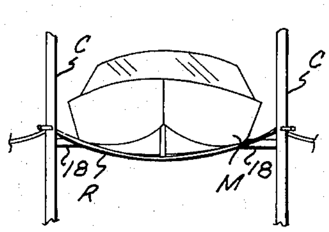
FIG. 4
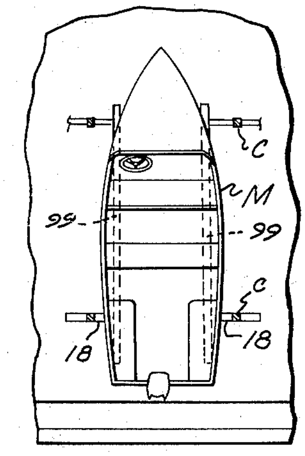
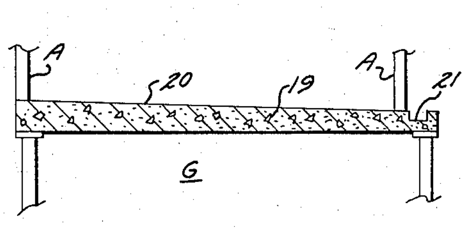
FIG. 5
FIG. 3
INVENTOR.
ANDREW M. FILAK
BY
William C. Babcock
ATTORNEY June 15, 1965 A. M. FILAK 3,189,198

SMALL BOAT DRY STORAGE FACILITY

Filed Oct. 3, 1963 4 Sheets-Sheet 3

INVENTOR.
ANDREW M. FILAK

BY

William C. Babcock

ATTORNEY

June 15, 1965 A. M. FILAK 3,189,198

SMALL BOAT DRY STORAGE FACILITY

Filed Oct. 3, 1963 4 Sheets-Sheet 4

INVENTOR.
ANDREW M. FILAK

BY

William C. Babcock

ATTORNEY 3,189,198

SMALL BOAT DRY STORAGE FACILITY

Andrew M. Filak, 4105 Admirable Drive, Portuguese Bend, Calif.

Filed Oct. 3, 1963, Ser. No. 313,606
12 Claims. (Cl. 214—16.4)

The present invention relates generally to the field of small boat storage, and more particularly to a dry storage facility for boats of not greater than a predetermined length.

During the past few years the popularity of small boats has increased tremendously, particularly with boats in the fourteen to twenty-two foot classes. Due to the increased popularity thereof, a serious problem prevails as to the storage of small boats when not in use. Two disadvantages of storing small boats by renting slips at marinas involves the cost thereof and the fact that such space is extremely limited, and in many localities, not available. Further disadvantages of docking small boats by "wet storage" at a yacht anchorage are that the boats are subject to pilfering, chafing due to the rise and fall of the tides, hull growths, and engine deterioration due to the atmospheric moisture.

Many boat owners have attempted to minimize or eliminate some of the above mentioned disadvantages of small boat storage at a yacht anchorage by using a trailer and moving the boat from an inland locale to a body of water when it is desired to use the boat. The disadvantages of this operation other than the time involved are fairly obvious, for after securing a trailer, whether by purchase or lease, the boat owner must travel over crowded highways to reach a body of water, must wait his turn at the launching site and frequently pay launching fees to place the boat in and remove it from the water. Also, with the use of a trailer the boat owner runs the hazard of damage to the hull in taking his boat to and from a body of water and must arrange for parking and storing of the trailer and boat when not in use.

A major object of the present invention is to provide a dry storage facility for small boats adjacent a body of water wherein the same will be used, and one that will eliminate many problems encountered in the wet storage of a boat or the transfer thereof to and from a body of water by trailer.

Another object of the invention is to provide a compartmented frame building in which small boats may be stored, each in its own compartment when not in use, and protected from the elements, whereby the need for a trailer is eliminated, the possibility of pilferage is minimized, the boat is readily available for use when required, and the boat owner has immediate access to a body of water.

Yet another object of the invention is to provide a dry storage facility for small boats that not only will materially assist boat owners, but will permit the owner of the facility to operate the same at a substantial profit due to rental of the storage compartments as well as from such auxiliary activities as the sale of boats and marine hardware and accessories. In addition, such auxiliary activities may include the provision of club facilities, a snack bar, nautical clothing shop, lockers, as well as recreational facilities for children, automotive parking areas, and servicing of automotive vehicles.

These and other objects and advantages of the present invention will become apparent from the following description thereof, and from the accompanying drawings, in which:

FIGURE 2 is a front elevational view of a portion of the storage facility, taken on the line 2—2 of FIGURE 1;

FIGURE 3 is a top plan view (taken on the line 3—3 of FIGURE 2) of a boat removably resting on two laterally spaced boat support assemblies;

FIGURE 4 is a front elevational view of a boat when stored as shown in FIGURE 2, and showing the manner in which the under surface of the bow portion thereof is removably supported on a sling;

FIGURE 5 is a fragmentary transverse cross-sectional view of a portion of the facility shown in FIGURE 2, taken on the line 5—5 thereof;

Figure 1:
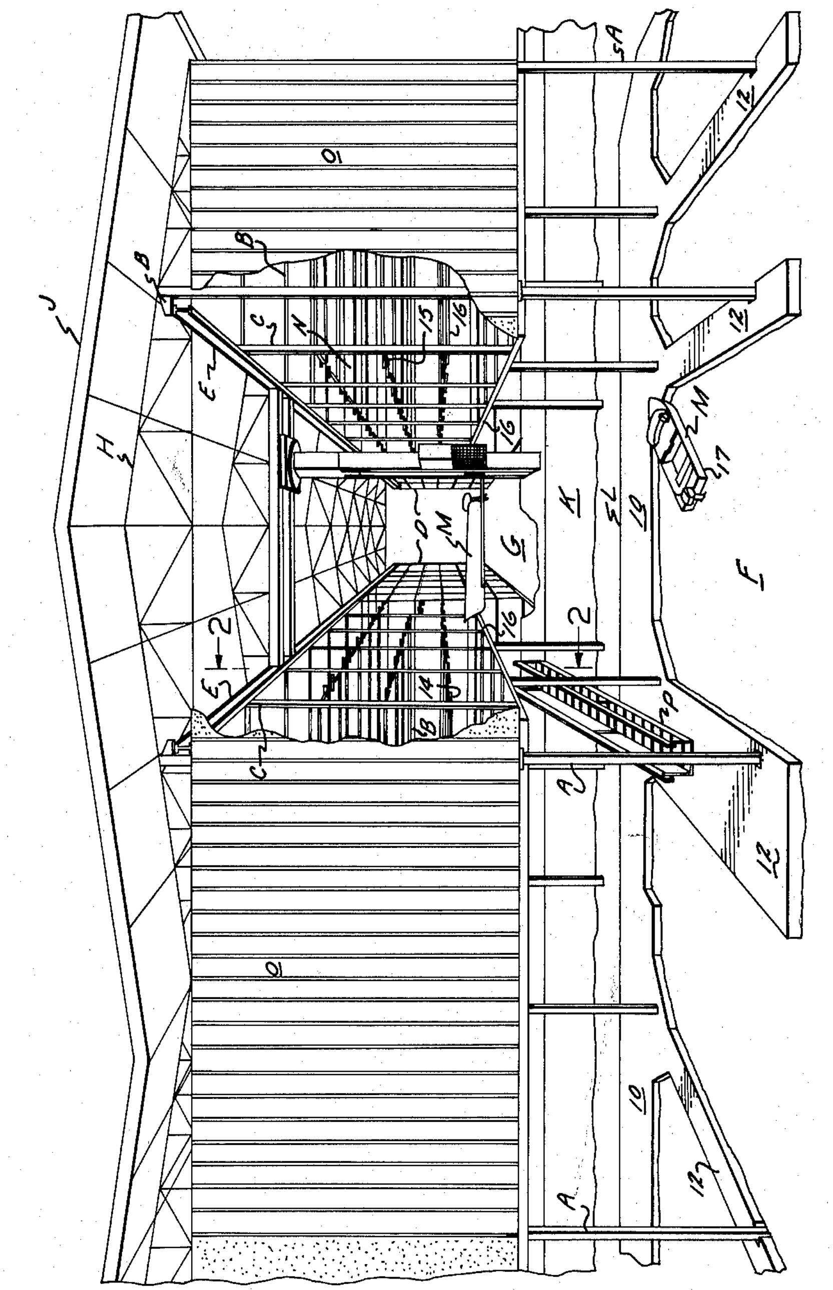
FIGURE 1 is a perspective view of one form of dry storage facility for small boats.

With continuing reference to the drawings for the general arrangement of the first form of the invention, it will be seen in FIGURE 1 that a number of longitudinally and transversely spaced steel columns A are arranged in cooperation with a number of horizontally extending, vertically spaced cross pieces B to define two frameworks C. The frameworks C are separated by a corridor D of substantial width. The upper portions of the two frameworks C adjacent the corridor D support two parallel, laterally spaced runways E.

The two frameworks C are so arranged relative to a body of water F that at least portions of the runways E project out over the water. Those portions of the columns A transversely positioned relative to the portions of the runways E projecting out over the body of water F extend downwardly into the water and are supported on their lower ends by suitable foundations (not shown) below the water. The portion of the frameworks C not extending over the water are supported on suitable foundations (not shown) on the land surface G over which the balance of the frameworks extend. The frameworks C are preferably connected at their upper end portions by trusses H of conventional design, which trusses support a suitable roof structure J.

If desired, a wall K may be extended under the frameworks C as shown in FIGURE 1, which serves to prevent the water F from flooding the facility in the event of storms, high tides, and the like.

A number of float units L are provided that are arranged to define a longitudinally extending walkway 10 from which a number of fingers 12 project, and to which small boats M may be temporarily moored. The columns A and cross pieces B cooperatively define a number of vertically and horizontally spaced compartments N in the frameworks C which open on the corridor D and extend from the corridor in opposite directions. The columns A, as can best be seen in FIGURE 1, support vertically extending side walls O that enclose the ends of the frameworks C, and can be extended along the longitudinal outer portions of the frameworks as desired. An inclined ramp P is provided for convenience of communication from within the facility and the walkway 10 and fingers 12.

A number of horizontally disposed, vertically spaced boat support assemblies 15 are mounted on the columns A adjacent the corridor D, as shown in FIGURES 1 and 2. A plurality of transversely arranged cross pieces 16 are provided that serve to connect the columns A to define the two rigid frameworks C. Each pair of two adjacently disposed columns A on the outer portions of the frameworks C support a number of vertically spaced, resilient slings R therebetween on which the under part of the bow portions of boats M may rest when they are housed in the compartments N. The positions of the slings R for supporting the under bow portions of the boats M are shown in FIGURES 2 and 4.

The floor 19 (FIGURES 2 and 5) overlying ground G has a slightly sloping upper surface 20 whereby any water which drips from the boats M drains into a gutter 21 formed in the floor. The two runways E include parallel, longitudinally extending rails 22. The rails 22 can be supported on the inner ends of flanges 24 forming a part of channel-shaped structural members 26, which are rigidly supported by welding, or the like, from the upper portions of columns A, as can best be seen in FIGURE 1. Flanged wheels 28 that are rigidly affixed to shafts 30 engage rails 22.

A bridge S is provided that may be of the under hung or top riding type and which is fabricated from two spaced cross members 32, the ends of which are connected by end pieces 34. The shafts 30 are journaled in end pieces 34 and are driven by first prime movers 36. A truck T is supported by flanged wheels 38 that rest on cross members 32. Wheels 38 are rigidly affixed to shafts 40 that are journaled in truck T. The shafts 40 and wheels 38 are power-driven by a second prime mover 42.

A turntable 44 is rotatably supported on truck T and is adapted to be rotated in a horizontal plane by a prime mover 46 that is mounted on truck T and connected to the turntable 44 by a shaft 48, or other suitable connection. The turntable 44 has two parallel, hollow members 50 depending therefrom.

Figures 11, 12, 13, 14, 15, 16, 17, 18:
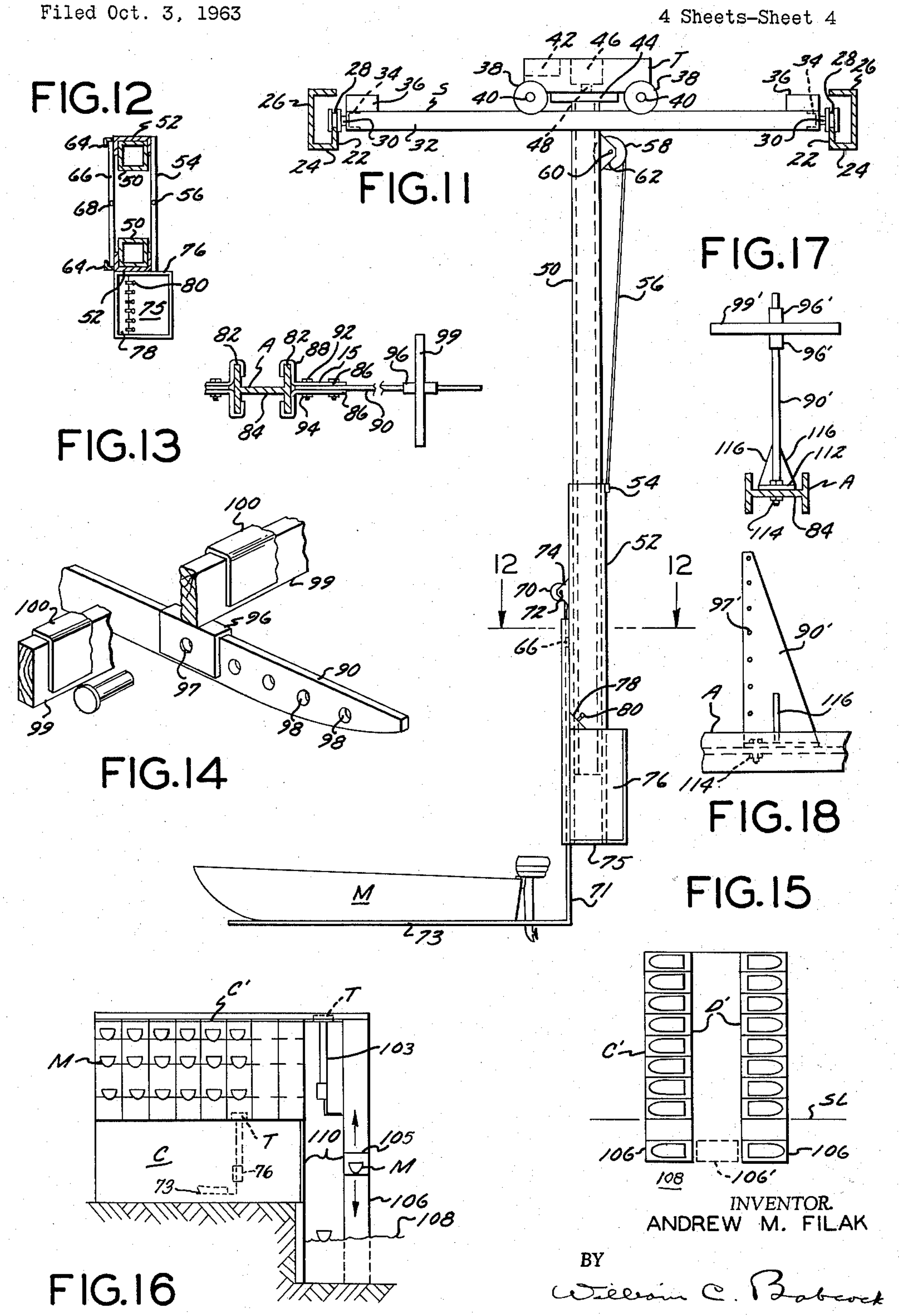
FIGURE 11 is a combined side elevational and vertical cross-sectional view of the traveling crane structure shown in FIGURE 1.
FIGURE 12 is a horizontal cross-sectional view of the crane shown in FIGURE 11, taken on the line 12—12 thereof.
FIGURE 13 is a combined horizontal cross-sectional view and top plan view of one of the boat support assemblies, taken on the line 13—13 of FIGURE 2.
FIGURE 14 is a perspective view of a portion of the boat support assembly shown in FIGURE 13.
FIGURE 15 is a top plan view of a seventh arrangement of dry storage facility for small boats.
FIGURE 16 is a side elevational view of the facility shown in FIGURE 15.
FIGURE 17 is a top plan view of an alternate form of boat support assembly.
FIGURE 18 is a side elevational view of the alternate form of boat support assembly.

Two second channel-shaped elongate members 52, best seen in FIGURE 12, slidably engage the hollow first members 50. The second elongate members 52 are connected by a horizontal cross piece 54 from which a cable 56 extends upwardly to a reel 58 that is mounted on a shaft 60. The ends of shaft 60 are journaled in bearings 62 affixed to the first members 50.

When it is desired to raise the second members 52 relative to the first members 50, the reel 58 is rotated by third power means (not shown). Two vertical angle iron members 64 are mounted on the second members 52, as best seen in FIGURE 12. The angle iron members 64 and members 52 cooperatively define vertically extending grooves in which a horizontal cross piece 66 is slidably mounted.

A cable 68 extends upwardly from cross piece 66 to a second reel 70 that is supported from the second members 52 by a shaft 72 which extends therebetween. The reel 70 may be rotated in either of two directions by power means (not shown). The ends of the shaft 72 are rotatably supported in bearings 74 that are affixed to the second members 52. Two legs 71 depend from cross piece 66 which support two tines 73 from the lower ends thereof. The tines 73 are parallel and so laterally spaced that they can removably engage the lower portion of a boat M to lift the same or position it in the water as will hereinafter be explained in detail.

One of the second members 52 supports a platform 75 on which an operator can stand, which platforms has a wall 76 extending upwardly therefrom for the protection of the operator (not shown). A control board 78 is disposed adjacent to the platform 75, and a number of manually operable levers 80 are associated with this board by which an operator may selectively control each of the prime movers previously described.

From the previous description of the crane which may be of the under hung or overriding type designated generally by the letter U and shown in FIGURES 11 and 12, it will be seen that it is capable of a number of different motions. Crane U can move longitudinally along the runways E, and the truck T can move transversely across the corridor D on the bridge S.

The turntable 44 can rotate 360° in a horizontal plane. The two channel-shaped members 52 can move upwardly and downwardly relative to members 50, and the tines 73 may be moved vertically relative to the members 52. In FIGURE 11 is will be noted that the tines 73 can be moved to positions below the channel-shaped members 52 to engage boat M when it is floating on a body of water F. The tines 73, can, of course, be moved downwardly relative to the members 52 to deposit one of the boats M on the body of water F. Although the movable components of the crane U have been shown as mechanically actuated, they may be actuated by fully hydraulic; hydraulic-pneumatic; hydraulic-mechanical; electrical-hydraulic; electrical-mechanical; electrical-pneumatic; mechanical-electrical; or mechanical-pneumatic means.

Each of the columns A, as best seen in FIGURE 13 is preferably an I-beam having two flanges 82 connected by a web 84. A preferred form of boat support assembly 15 is shown in FIGURE 13 that is vertically adjustable on one of the columns A. Each boat support assembly 15 includes flat plates 86, a vertical edge of each of which develops into a U-shaped portion 88 that engages an edge portion of one of the flanges 82. An elongate rigid member 90 formed of flat plate, or the like, is positioned between the two plates 86. Two bolts 92 having nuts 94 in engagement therewith extend through transverse bores 98 formed in the plates 86 and member 90. By tightening the nuts 94, the U-shaped portions 88 are drawn towards one another to frictionally engage vertically extending edge portions of one of the flanges 82 to hold the member 90 at a desired elevation. Each member 90 has a yoke 96 slidably movable thereon. Transversely aligned bores 97 are formed in the depending portions of yoke 96 which may be aligned with any one of a number of longitudinally spaced openings 98 in member 90. Each yoke 96 is provided with an elongate boat support 99 that may be a 2" x 6" piece of lumber, or the like, mounted by conventional means on the upper portion thereof and positioned in a direction normal relative thereto. Each boat support 99 is covered by a resilient sheath of material which serves as a bumper 100.

Adjacently disposed yokes 96 and the boat supports 99 mounted thereon are longitudinally adjusted on members 90 to so position them that under portions of the boats M will rest thereon. After the yokes 96 have been so adjusted, pins or bolts (not shown) are caused to engage bores 97 and openings 98 to hold the yokes and boat supports in fixed positions relative to the members 90. When a sling R is used with the boat supports 99 they will project outwardly several feet on each side of yoke 96. However, if desired the boat supports 99 can extend outwardly from one side of the yoke 96 the length of the boat M to be supported as shown in FIGURE 3, and in such a situation the slings R are not required. Vertical adjustment of the boat support assemblies 15 is highly desirable for the boats M vary in height, and by vertically adjusting the boat supports, a maximum number of boats may be stored in the frameworks C.

Figures 6, 7:
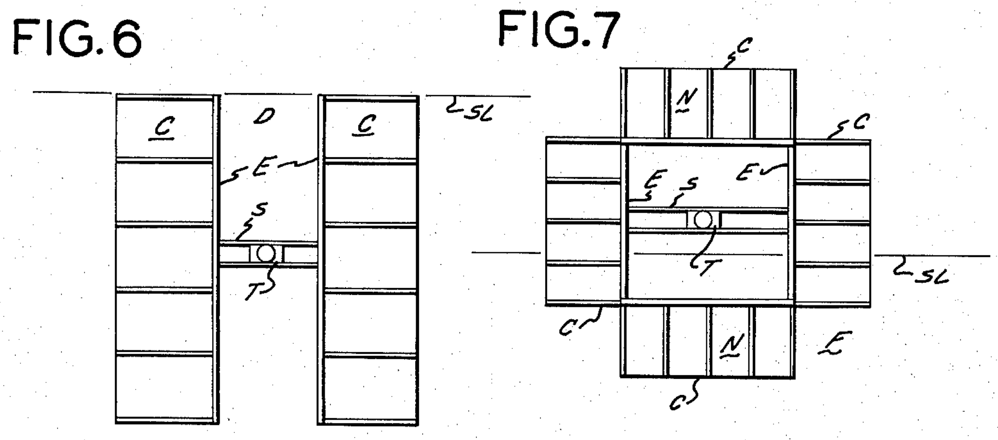
FIGURE 6 is a schematic plan view of a second arrangement of dry storage facility for small boats.
FIGURE 7 is a schematic plan view of a third arrangement of dry storage facility for small boats.

The arrangement of the frameworks C relative to the body of water F may vary, and in FIGURE 6 a diagrammatic view of two frameworks C separated by a corridor D in shown that comprise a second form of the invention, but with the frameworks being disposed completely over the water F rather than just partially thereover as shown in FIGURE 1. When the frameworks C are disposed as shown in FIGURE 6, they support runways E on which a bridge S is movably mounted as previously described, and this bridge supports the crane assembly U, as shown in FIGURE 11. The shoreline in FIGURE 6 is indicated by the line SL.

A third form of small boat dry storage facility is shown in FIGURE 7 that includes four compartmented frameworks C arranged about a hollow square. Two of the oppositely disposed frameworks C support runways E that movably support a bridge S on which a truck T is mounted. Truck T supports crane assembly U (FIGURE 11), and due to the flexibility thereof the crane assembly is capable of raising boats from, or lowering them into the body of water F, as well as placing the boats in storage in the compartments N and removing them therefrom.

Figures 8, 9, 10:
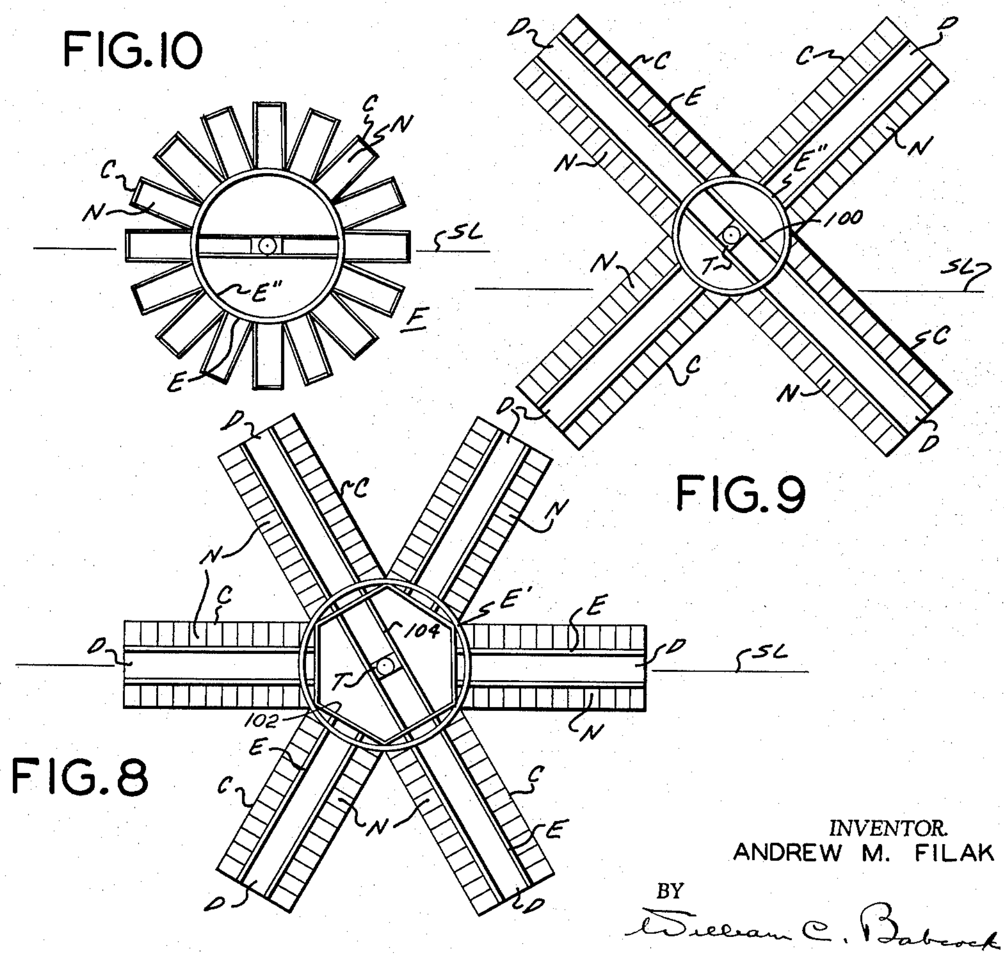
FIGURE 8 is a schematic plan view of a fourth arrangement of dry storage facility for small boats.
FIGURE 9 is a schematic plan view of a fifth arrangement of dry storage facility for small boats.
FIGURE 10 is a schematic plan view of a sixth arrangement of dry storage facility for small boats.

A fourth form of small boat dry storage facility is shown in FIGURE 8 which includes a circular runway E′ that rotatably supports a hexagonal hollow support 102. Two parallel rails 104 are mounted on support 102. Rails 104 movably support a truck T from which the crane assembly U as shown in FIGURE 11, depends. Six circumferentially spaced frameworks C extend outwardly from the runway E′, and are of the same structure as the frameworks shown in FIGURE 1. By aligning the rails 104 with the runway E′ within the frameworks C (FIGURE 8) the crane U may be moved to a desired position relative to any one of the compartments N. The shoreline in FIGURE 8 is indicated by the line SL.

FIGURE 9 illustrates a fifth form of the invention in which four frameworks C are arranged in the form of a cross having a hollow center. Each leg of the crossed frameworks C has a longitudinally extending corridor D running through the center thereof. The frameworks C support runways E. The hollow center portion of the cross has a circular runway E″ that rotatably supports two rails 100 on which the truck T may move. When the rails 100 are in alignment with a desired one of the runways E, the truck T and crane assembly U (FIGURE 11) may move longitudinally along two of the aligned legs of the frameworks C as shown in FIGURE 9.

A sixth form of small boat dry storage facility is shown in FIGURE 10 wherein a number of frameworks C that define compartments N are arranged about a circular runway E″. Runway E″ supports a bridge S on which a truck T is movably mounted, with the truck supporting the crane assembly U shown in FIGURE 11. By rotatably moving the bridge S on the circular runway E shown in FIGURE 10, boats may be deposited in the compartments N or removed therefrom, as well as lowered into the body of water F or removed therefrom.

A seventh form of small boat dry storage facility is shown in FIGURES 15 and 16, and which is particularly adapted to be built over the second form of facility shown in FIGURE 6. The seventh form of the invention includes a framework C′ as best seen in FIGURE 16, and is built above the frameworks C. Framework C′ is compartmented in the same manner as frameworks C for storage of a plurality of small boats M. Crane assembly 103 is provided for the servicing of boats M when placing the same in the framework C′ or removing them therefrom.

An elevator 105 is associated with framework C that is vertically movable within an elevator shaft 106. The cage 106 is located forwardly of framework C over the water 108, and extends downwardly from the uppermost portion of the framework C′ to a position below the water surface. A boat M may be positioned on the elevator 105 and then raised to a position where it may be removed therefrom by the crane assembly 103 and subsequently positioned in one of the compartments in the framework C′, as previously explained in detail in connection with the framework C. Likewise, the crane assembly 103 may be utilized to remove boats M from the framework C′, and then transport the boat to a position where it may be loaded onto the elevator 105 and the elevator and boat lowered to permit the boat to be launched into the water 108.

The elevator shaft 106, as can best be seen in FIGURE 16, is spaced forwardly from the frameworks C and C′ to leave a space 110 between it and the frameworks. Boats M may enter the space 110 when floating on the water 108, and be picked upwardly therefrom or launched into the water by use of the crane assembly shown in detail in FIGURE 11, which services the frame work C. If desired, each side of the framework C′ can be provided with an elevator 105 in a shaft 106, or in lieu of this construction, a centrally disposed shaft 106′ may be provided as shown in phantom line in FIGURE 15, that has an elevator 105 therein, which services both sides of the framework C′ in removing boats from the water 108, as well as returning them to the water for launching.

The tines 73 on which the boats M rest during movement thereof are preferably laterally adjustable relative to one another by means not shown. This construction is conventional on fork lifts as is well known in the field of present day lifting apparatus, and accordingly need not be described in detail.

Should the columns A be disposed in positions in which they are rotated 90° from that shown in FIGURE 13, a first alternate form of boat assembly 15′ may be provided as shown in FIGURES 17 and 18. The first alternate form of boat assembly 15′ includes an elongate plate 112 that is removably affixed to web 84 by a bolt 114. The plate 112 has an elongate rigid member 90′ projecting therefrom as best seen in FIGURES 17 and 18. Two gusset plates 116 extend between the member 90′ and plate 112 to reinforce the member 90′ in a transverse direction. A yoke 96′, identical to yoke 96, is slidably mounted on the elongate member 90′ and can be adjusted to any one of a number of desired longitudinal positions thereon, by causing a pin (not shown) to engage an opening in the yoke and one of the spaced bores 97′, as shown in FIGURE 18. The yoke 96′ has an elongate boat support 99′ mounted thereon which serves the same function as the boat support 99 previously described in detail.

The use and operation of the invention have been described in detail and need not be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. A dry storage facility for boats of not greater than a predetermined length in which boats can be stored and selectively removed therefrom for use on a body of water, and removed from said water for storage or maintenance including:

(a) two parallel, laterally spaced runways that extend at least partially over said body of water;

(b) two elongate open frameworks separated by a longitudinally extending corridor of greater width than said predetermined length of said boat, which frameworks are defined by a plurality of vertical columns and cross pieces;

(c) a plurality of horizontal, vertically spaced boat supports that are mounted on said columns and disposed adjacent to said corridor;

(d) a plurality of vertically spaced resilient slings extending between the outermost of said columns in said frameworks, with said boat supports and slings co-operatively defining a plurality of compartments in which said boats can be removably positioned, with each of said boats when so positioned having the bow portion thereof suported by one of said slings and the stern portion thereof by said boat supports;

(e) first means for supporting one of said boats to move the same from one location to another;

(f) power-driven crane means situated in said corridor and movably supported on said runways, said crane means having a movable portion thereof connect to said first means, which movable portion and said first means being adapted to be moved vertically to deposit one of said boats in said body of water or remove one of said boats therefrom, said crane means capable of being moved longitudinally on said runways until it is in vertical alignment with a desired one of said compartments to permit said movable portion and said first means to be moved vertically and transversely to deposit one of said boats in said desired compartment or lift one of said boats therefrom.

2. A dry storage facilitity as defined in claim 1 which further includes means for vertically adjusting said boat supports to desired heights on said columns.

3. A dry storage facility as defined in claim 1 which further includes a roof that extends over said frameworks, as well as walls that extend along the outer sides and ends of said frameworks.

4. A dry storage facility as defined in claim 1 in which said first means comprise two elongate, laterally spaced tines on which said boats are supported.

5. A dry storage facility as defined in claim 1 wherein said crane means can move said movable portion thereof longitudinally and transversely relative to said runways, horizontally through 360°, and vertically to the extent that one of said boats can be deposited in or removed from the uppermost ones of said compartments, as well as lowered into and removed from said body of water.

6. A dry storage facility as defined in claim 1 wherein said frameworks are partially positioned on land and partially over said body of water.

7. A dry storage facility as defined in claim 1 wherein substantially all of said frameworks are disposed over said body of water.

8. A dry storage facility as defined in claim 1 which further includes two additional frameworks located at the ends of said corridors, which additional frameworks have compartments defined therein in which said boats can be stored or removed therefrom by said first means.

9. A dry storage facility as defined in claim 1 which further includes additional pairs of said open frameworks having adjacently disposed ends positioned about a circular opening, as well as rail means rotatably movable in said open center which permit said crane means to move from one of said frameworks to another as desired.

10. A dry storage facility for boats of not greater than a predetermined length in which said boats can be stored and selectively removed therefrom for use on a body of water, and removed from said water for storage or maintenance, including:

(a) two elongate open frameworks formed from vertical columns and cross pieces, said frameworks being separated by a longitudinally extending corridor of greater width than said predetermined length of said boat;

(b) two parallel, laterally spaced runways supported from adjacent upper sections of said frameworks and extending longitudinally along said corridor, with at least portions of said runways being disposed over said body of water;

(c) a plurality of boat-supporting means mounted on said frameworks and cooperating therewith to define a plurality of compartments disposed in a direction normal relative to said corridor, with each of said compartments being capable of having one of said boats stored therein;

(d) a transverse bridge extending between said runways which is movably supported thereon;

(e) a truck movably mounted on said bridge and capable of moving axially relative thereto;

(f) a turntable rotatably supported from said truck, said turntable being capable of rotating in a horizontal plane;

(g) at least one first elongate rigid member depending from said turntable;

(h) at least one second elongate rigid member slidably movable relative to said first member;

(i) two laterally spaced tines which project outwardly from the lower end of said second member that can be extended under the hull of a boat to removably support the same either when said boat is disposed on said boat-supporting means or when said boat is floating on said body of water;

(j) a horizontal platform supported by said second member a distance sufficiently great above said tines that said platform remains above the surface of said body of water when one of said boats is being lowered therein or retrieved therefrom by the use of said tines;

(k) power means for selectively moving said bridge, said truck on said bridge, said turntable on said truck, and said second member, to place said tines in engagement with said under portion of a desired one of said boats to remove said boat from one of said compartments and thereafter move the same to a position where it is launched in said body of water, or place said tines in engagement with said under portion of a boat afloat on said body of water and thereafter move said floating boat to a position where it is removably supported in a desired one of said compartments; and (l) control means for selectively actuating said power means, with said control means being located sufficiently close to said platform as to be manually operable when an operator is supported by said platform.

11. A dry storage facility as defined in claim 10 which further includes:

(m) a power-driven, vertically movable elevator supported from said framework and disposed outwardly therefrom above said body of water, which elevator is capable of raising one of said boats from said body of water to a position where said boat can be engaged by said tines, and with said elevator being capable of receiving one of said boats from said tines and lowering said boat to a position where it floats on said body of water.

12. A dry storage facility for boats of no greater than a predetermined length wherein said boats can be stored and selectively removed therefrom for use on a body of water, and removed from said water for storage or maintenance, including:

(a) a plurality of pairs of elongate open frameworks formed from vertical columns and cross pieces, which pairs radiate outwardly from a central area, with said frameworks in each of said pairs being separated by a longitudinally extending corridor of greater width than said predetermined length of said boat, and with at least a portion of said pairs being disposed over said body of water;

(b) a plurality of pairs of runways supported from adjacent upper sections of said frameworks and extending longitudinally along said corridors, with at least portions of said runways being disposed over said body of water;

(c) a plurality of boat-supporting means mounted on said frameworks and cooperating therewith to define a plurality of compartments disposed in a direction normal to said corridor, with each of said compartments being capable of having one of said boats stored therein;

(d) an elevated circular member disposed in said central area;

(e) a pair of parallel rails spaced apart the same distance as each of said pairs of runways;

(f) means for rotatably supporting said pair of rails in vertically spaced relationship relative to said circular member;

(g) means for rotating said pairs of rails to place the same in longitudinal alignment with a desired one of said pairs of runways;

(h) a transverse bridge extending between said pair of rails and longitudinally movable relative thereto as well as to a selected one of said pairs of runways when said pair of rails and said selected one of said pair of runways are in coaxial alignment;

(i) a truck movably mounted on said bridge and capable of moving axially thereon;

(j) a turntable rotatably supported from said truck, said turntable being capable of rotating in a horizontal plane;

(k) at least one first elongate rigid member depending from said turntable;

(l) at least one second elongate rigid member slidably movable relative to said first member;

(m) two laterally spaced tines which project outwardly from the lower end of said second member that can be extended under the hull of a boat to removably support the same either when said boat is disposed on said boat-supporting means or when said boat is floating on said body of water;

(n) a horizontal platform supported by said second member a distance sufficiently great above said tines that said platform remains above the surface of said body of water when one of said boats is being lowered therein or retrieved therefrom by the use of said tines;

(o) power means for selectively moving said bridge, said truck on said bridge, said turntable on said truck, and said second member, to place said tines in engagement with said under portion of a desired one of said boats to remove said boat from one of said compartments and thereafter move the same to a position where it is launched in said body of water, or place said tines in engagement with said under portion of a boat afloat on said body of water and thereafter move said floating boat to a position where it is removably supported in a desired one of said compartments; and (p) control means for selectively actuating said power means, with said control means being located sufficiently close to said platform as to be manually operable when an operator is supported by said platform.

References Cited by the Examiner

UNITED STATES PATENTS

| | | | |
|---|---|---|---|
| 2,765,928 | 10/56 | Riemenschneider | 214—16.4 X |
| 2,963,169 | 12/60 | Konstant | 214—16.42 X |
| 3,080,073 | 3/63 | Calandra | 214—16.4 |
| 3,082,887 | 3/63 | Brooks | 214—16.4 |

FOREIGN PATENTS

| | | |
|---|---|---|
| 125,312 | 6/49 | Sweden. |

HUGO O. SCHULZ, *Primary Examiner.*